United States Patent [19]

Schott

[11] 4,279,431
[45] Jul. 21, 1981

[54] COUPLING HOOK

[75] Inventor: Wilhelm Schott, Cologne, Fed. Rep. of Germany

[73] Assignee: Jean Walterscheid GmbH, Lohmar, Fed. Rep. of Germany

[21] Appl. No.: 57,430

[22] Filed: Jul. 13, 1979

[30] Foreign Application Priority Data

Jul. 22, 1978 [DE] Fed. Rep. of Germany ....... 2832367

[51] Int. Cl.³ .............................................. B60D 1/04
[52] U.S. Cl. ................................... 280/508; 280/514; 220/DIG. 6
[58] Field of Search ............... 280/508, 509, 510, 504, 280/456 A, 460 A, 461 A, 490 A, 514; 172/439; 220/DIG. 6, 1 A, 1 C

[56] References Cited

U.S. PATENT DOCUMENTS 4,014,562  3/1977  Kunze .................................. 280/508

FOREIGN PATENT DOCUMENTS 802806   2/1951  Fed. Rep. of Germany .... 220/DIG. 6
1457678  4/1969  Fed. Rep. of Germany .......... 172/439

Primary Examiner—John P. Silverstrim

[57] ABSTRACT

In a coupling hook for the lower links of a three-point linkage for connecting an agricultural implement to a tractor, side walls define the lateral confines of a pocket. The side walls are shaped to form a jaw into which a coupling element is seated. A latch within the pocket secures the coupling member in the jaw. A bottom wall extends across the lower ends of the side walls and forms a closure for the pocket. One of the side walls has an opening just above the bottom wall for removing dirt from the lower end of the pocket.

3 Claims, 2 Drawing Figures

COUPLING HOOK

SUMMARY OF THE INVENTION

The present invention is directed to a coupling hook, particularly for use in the lower links of a three-point linkage for connecting an agricultural implement to a tractor, and the hook has a pocket closed at its bottom in which a locking mechanism is mounted. A discharge opening extends laterally from the pocket above its closed bottom for removing any dirt which enters the pocket from the top.

Coupling hooks with a discharge opening for removing dirt are known, such as in U.S. Pat. No. 4,014,562. Such discharge openings, however, have been arranged in the bottom of the coupling hook to facilitate an unobstructed removal of dirt and also to facilitate the assembly of a spring used in cooperation with the coupling hook latch.

It has been found, however, that locating the discharge opening in the bottom of the coupling hook has significant disadvantages. If, for example, when the coupling hook is used to attach an implement which cultivates a field, the coupling pins for the lower links are located so that the coupling hooks are frequently dragged directly along the soil and dirt is pressed into the hook pocket through the bottom opening.

Another disadvantage of the known embodiments is that the bottom of the coupling hook is not easily accessible for cleaning which is necessary from time to time when the pocket of the hook must be cleaned with a screwdriver or similar tool.

Moreover, the lower links usually cannot be lifted to the extent that a person, performing the cleaning operation, can see into the open hook pocket from the bottom. Under such circumstances, it is very difficult to check whether the hook pocket is dirty.

Another disadvantage in locating the opening in the bottom of the coupling hook involves the reduction in the strength of the hook. When the bottom is open, the resistance moment is significantly reduced particularly in the principal direction of stress.

Therefore, it is the primary object of the present invention, to provide a coupling hook which avoids the disadvantages experienced in the past without requiring any increased costs in the production of the coupling hook. In accordance with the present invention, the coupling hook is provided with a pocket closed at the bottom and with a discharge opening formed through one of the side walls of the coupling hook just above the closed bottom.

In this arrangement, the dirt is not forced through the discharge opening into the pocket when the lower links are dragged over the surface of a field.

Additionally, the lateral discharge opening is more accessible for cleaning dirt out of the pocket and the operator is better able to look through the opening into the pocket.

Furthermore, the design of the closure for the bottom of the pocket results in a significant increase in the strength of the coupling hook and an improved force transmission is afforded from the hook jaw to the lower link.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
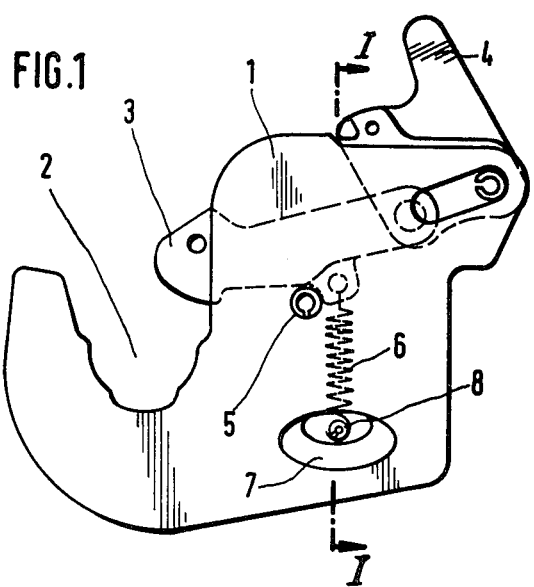
FIG. 1 is a side view of a coupling hook embodying the present invention.

As illustrated in FIG. 1, a coupling hook 1 is shaped or cut out to form a hook jaw 2. A locking mechanism is provided within the coupling hook and includes a latch 3 and an actuating lever 4 articulated to the latch and located at the top of the coupling hook. A locking spring 6 is positioned within the hook in a hook pocket 9, note FIG. 2, and the spring acts on the latch 3 for holding it in the locking position. During movement, the latch is supported on a member 5 and the locking spring 6 holds the latch against the member 5. As can be seen in FIG. 1 the locking spring 6 is connected at its upper end to the latch 3 and at its lower end to a spring support 8. For locking a coupling element of an element into the coupling hook, the latch 3 projects into the coupling jaw 2. By pivoting the actuating lever 4, the latch 3 can be displaced from the locking position.

Figure 2:
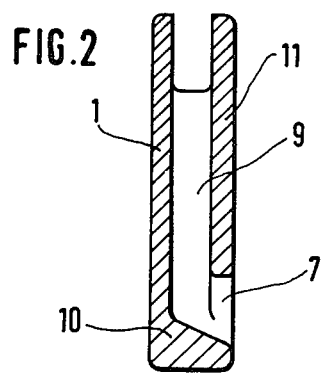
FIG. 2 is a sectional view of the coupling hook taken along the line I—I in FIG. 1.

As can be seen in FIG. 2, upwardly extending side walls 11 define the lateral confines of the hook pocket 9. The lower end or side of the hook pocket is closed by a bottom member 10. One of the side walls 11 has a discharge opening 7 at its lower end opening laterally into the bottom of the pocket 9. Due to the location of the discharge opening at the side rather than the bottom of the pocket 9, there is better visibility of the interior of the pocket and the assembly of the locking spring 6 onto the spring support 8 is much simpler. As can be seen from the combination of FIGS. 1 and 2, the surface of the bottom 10 slopes toward the opening 7.

If the coupling hook illustrated in FIGS. 1 and 2 is connected to lower links of a three-point linkage, and the lower links are dragged over the surface of a field, the laterally positioned discharge opening is protected against dirt being forced upwardly into the pocket 9. Further, the location of the discharge opening facilitates the cleaning out of the pocket.

By providing the bottom 10 on the coupling hook, a significantly higher resistance moment in the principal direction of stress is provided overcoming the disadvantage present when the bottom of the coupling hook is open.

While specific embodiments of the invention have been shown and described in detail to illustrate the application of the inventive principles, it will be understood that the invention may be embodied otherwise without departing from such principles.

What is claimed is:

1. A coupling hook, particularly for use in the lower links of a three-point linkage for connecting an agricultural implement to a tractor, comprising upwardly extending side walls each having an upper end and a lower end and laterally defining a pocket therebetween, at least one of said side walls being shaped to form a hook jaw for receiving a connecting element of an agricultural implement, means located within the pocket for latching the connecting element and securing it in said locking jaw, said means including a latch for latching the connecting element in the locked position and a locking spring for holding said latch in the locked position, wherein the improvement comprises a bottom wall extending across the lower ends of said side walls and forming a closure for the bottom end of the pocket, one of said side walls having an opening therethrough extending from the pocket to the exterior of the side wall and the opening being located above and adjacent said bottom wall, and said locking spring having an upper end connected to said latch and depending downwardly therefrom within the pocket and having a lower end connected to said coupling hook within the pocket and the connection of the lower end of said locking spring being located opposite the opening in one of said side walls so that the assembly of the lower end of said locking spring to said coupling hook is simplified and the location of the opening facilitates the cleaning out of the pocket.

2. A coupling hook, as set forth in claim 1, wherein said bottom wall has a top surface forming the bottom of the pocket, and at least in the region of the opening in said side wall said top surface of said bottom wall slopes downwardly toward the opening.

3. Coupling hook, as set forth in claim 2, wherein the lowermost edge of the opening in said side wall coincides with the top surface of said bottom wall at the location of the opening.

* * * * *